(12) United States Patent
Shatsky

(10) Patent No.: US 8,588,174 B2
(45) Date of Patent: *Nov. 19, 2013

(54) DUAL-MODE DEVICE AND METHOD FOR HANDOVER OF SESSION FROM VOIP INTERFACE TO CELLULAR INTERFACE

(75) Inventor: Alexander Shatsky, Waterloo (CA)

(73) Assignee: Blackberry Limited, Waterloo (CA)

( * ) Notice: Subject to any disclaimer, the term of this patent is extended or adjusted under 35 U.S.C. 154(b) by 1552 days.

This patent is subject to a terminal disclaimer.

(21) Appl. No.: 11/778,694

(22) Filed: Jul. 17, 2007

(65) Prior Publication Data

US 2009/0022103 A1 Jan. 22, 2009

(51) Int. Cl.
*H04W 4/00* (2009.01)
(52) U.S. Cl.
USPC ........... 370/331; 370/352; 370/351; 370/355; 370/356; 455/437; 455/442; 455/432.1; 455/436; 455/444
(58) Field of Classification Search
USPC .............. 455/560, 436, 432.1, 423, 442, 437, 455/444; 370/331, 352, 355, 356
See application file for complete search history.

(56) References Cited

U.S. PATENT DOCUMENTS

| | | | |
|---|---|---|---|
| 2004/0218575 A1 | 11/2004 | Ibe et al. | |
| 2004/0264410 A1 | 12/2004 | Sagi et al. | |
| 2005/0147049 A1 * | 7/2005 | Ganesan | 370/241 |
| 2006/0121894 A1 * | 6/2006 | Ganesan | 455/432.1 |
| 2006/0205436 A1 * | 9/2006 | Liu et al. | 455/560 |
| 2006/0256751 A1 | 11/2006 | Jagadeesan et al. | |
| 2009/0023450 A1 * | 1/2009 | George et al. | 455/442 |

FOREIGN PATENT DOCUMENTS

| | | |
|---|---|---|
| WO | WO2004105423 | 12/2004 |
| WO | WO2007025158 | 3/2007 |

OTHER PUBLICATIONS

Office Action dated Apr. 28, 2011 for corresponding Canadian Patent Application No. 2,637,996.

* cited by examiner

*Primary Examiner* — Khalid Shaheed
(74) *Attorney, Agent, or Firm* — Ridout & Maybee LLP

(57) ABSTRACT

A method and dual-mode device for handing over an active call from the device's VoIP interface to its cellular interface. The active call is placed on hold and a second call is established from the VoIP interface to the cellular interface of the dual-mode device, wherein the second call includes a VoIP leg from the VoIP interface of the dual-mode device to a communications server. The remote device involved in the VoIP call is then instructed to initiate a new call to the communications server referencing the second call and causing the communications server to replace the VoIP leg of the second call with the new call, thereby joining the remote party to the second call connected to the cellular interface of the dual-mode device. The active call is then terminated.

18 Claims, 9 Drawing Sheets

DUAL-MODE DEVICE AND METHOD FOR HANDOVER OF SESSION FROM VOIP INTERFACE TO CELLULAR INTERFACE

FIELD

The present application relates to dual-mode devices having both a cellular interface and a Voice-over-IP (VoIP) interface and, in particular, a method for switching an active session, for instance, a voice call, from the VoIP interface to the cellular interface.

BACKGROUND

Many enterprises are moving towards using VoIP over their LANs and WLANs to interconnect various terminal devices for voice communications. Moreover, external voice communications with remote parties through, for example, the PSTN, may be converted to VoIP communications for routing within the enterprise communication system. A Private Branch eXchange (PBX) typically acts as the interface between the PSTN and the internal enterprise communication system. The PBX provides conversion between digital circuit-switched calls and VoIP calls, and assists in routing calls to the correct terminal device. SIP signaling is commonly used to set-up, manage, and tear-down media paths for the VoIP calls.

Conventional mobile devices are configured for cellular wireless communications. Cellular communication may take place using any one of a number of cellular protocols, including GSM, CDMA, etc. Now, many mobile devices are configured for both cellular communications and IP communications. These are referred to a "dual-mode" devices.

Dual-mode devices may include, for example, handheld mobile devices, but can also include other devices configured for both cellular and IP communications. For example a "softphone" implemented on a laptop with WiFi connectivity may be a dual-mode device.

VoIP calls are often preferred over cellular calls when a device is within IP network coverage limits (e.g. on a WLAN campus), since the WLAN owner/enterprise may charge little or nothing for the VoIP call, and the enterprise, if any, can often provide enhanced services and maintain better control over the session. Nevertheless, cellular typically offers much more extensive coverage than the limited range associated with a WLAN installation. Accordingly, a need may arise to switch an active VoIP call to a cellular network.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
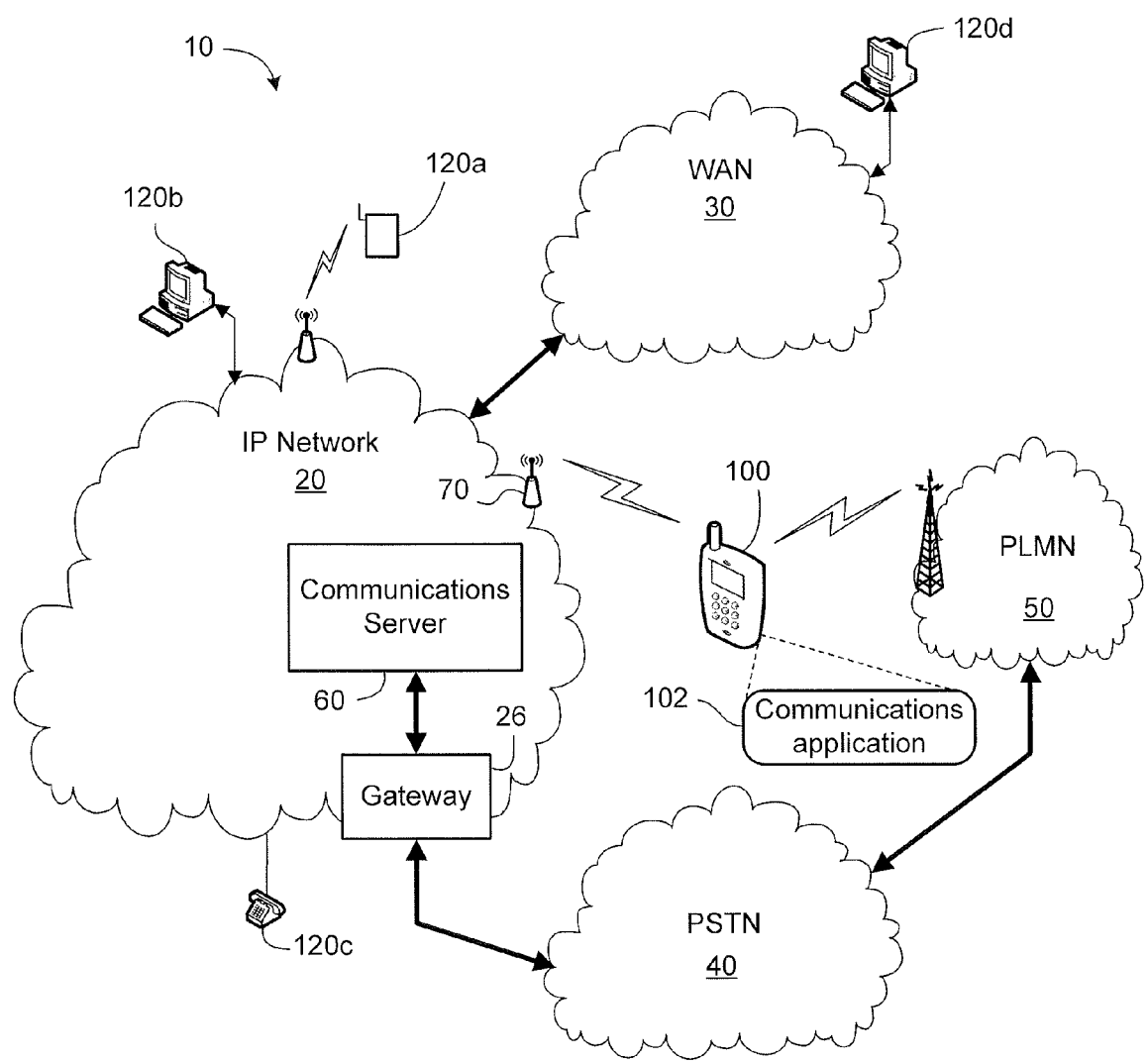
FIG. 1 shows, in block diagram form, an example system for VoIP and cellular calls.

In one aspect, the present application provides a method of handing over an active call between a dual-mode device and a remote device. The dual-mode device includes a Voice-over-IP (VoIP) interface for wireless communications over an IP network and a cellular interface for wireless communications over a public land mobile network (PLMN). The IP network includes a communications server and the active call is a VoIP call using the VoIP interface of the dual-mode device. The method includes the steps of placing the active call on hold; establishing a second call from the VoIP interface to the cellular interface of the dual-mode device via the communications server and the PLMN, wherein the second call includes a VoIP leg from the VoIP interface of the dual-mode device to the communications server; instructing the remote device to initiate a new call to the communications server referencing the second call and causing the communications server to replace the VoIP leg of the second call with the new call, thereby joining the remote party to the second call connected to the cellular interface of the dual-mode device; and terminating the active call.

In another aspect, the present application provides a dual-mode device configured for IP-based communication over an IP network and cellular wireless communication over a public land mobile network (PLMN). The IP network includes a communications server. The dual-mode device includes a cellular communications subsystem and a cellular interface for engaging in cellular wireless communications over the PLMN; an IP communication subsystem and a Voice-over-IP (VoIP) interface for engaging in IP-based voice communications over the IP network; a processor for controlling the communication subsystems; and a communications application executable by the processor and configured to manage the handover of an active VoIP call between the dual-mode device and a remote device from the VoIP interface and the cellular interface. The communications application includes a handover module configured to place the active call on hold, establish a second call from the VoIP interface to the cellular interface of the dual-mode device via the communications server and the PLMN, wherein the second call includes a VoIP leg from the VoIP interface of the dual-mode device to the communications server, instruct the remote device to initiate a new call to the communications server referencing the second call and cause the communications server to replace the VoIP leg of the second call with the new call, thereby joining the remote party to the second call connected to the cellular interface of the dual-mode device, and terminate the active call.

In yet another aspect, the present application provides a computer program product comprising a machine-readable medium having encoded thereon computer-executable instructions for handing over an active call between a dual-mode device and a remote device. The dual-mode device includes a Voice-over-IP (VoIP) interface for wireless communications over an IP network and a cellular interface for wireless communications over a public land mobile network (PLMN). The IP network includes a communications server and the active call is a VoIP call using the VoIP interface of the dual-mode device. The computer-executable instructions include instructions for placing the active call on hold; instructions for establishing a second call from the VoIP interface to the cellular interface of the dual-mode device via the communications server and the PLMN, wherein the second call includes a VoIP leg from the VoIP interface of the dual-mode device to the communications server; instructions for instructing the remote device to initiate a new call to the communications server referencing the second call and causing the communications server to replace the VoIP leg of the second call with the new call, thereby joining the remote party to the second call connected to the cellular interface of the dual-mode device; and instructions for terminating the active call.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Referring now to the drawings, FIG. 1 shows, in block diagram form, an example system 10 for VoIP and cellular calls. The example system 10 includes an IP network 20, which in one embodiment may include a local area network (LAN). The LAN may be an enterprise-specific IP network interconnecting various client devices and servers in an enterprise network. In some embodiments, the IP network 20 includes or is connected to a wide area network (WAN) 30, such as the Internet, typically through a firewall.

The system 10 also includes a public switched telephone network (PSTN) 40, and a public land mobile network (PLMN) 50, which may also be referred to as a wireless wide area network (WWAN).

The system 10 includes a dual-mode mobile device 100 configured for cellular communications over the PLMN 50 and IP communications over the IP network 20. The IP communications may take place through an Ethernet connection, WiFi connection, or other broadband connection capable of supporting IP connectivity with the device 100. In some scenarios, the mobile device 100 and the IP network 20 are owned or operated in common by the enterprise. For example, the mobile device 100 may be provided by the enterprise to one of its employees for use in connection with his or her employment. However, this is not necessarily the case in all embodiments.

The mobile device 100 is configured for wireless communication. In particular, the mobile device 100 includes an appropriate radio transceiver and associated software for communicating with the PLMN 50. The mobile device 100 may be capable of both wireless voice and data communications via the PLMN 50. In various embodiments, the PLMN 50 and mobile device 100 may be configured to operate in compliance with any one or more of a number of cellular wireless protocols, including GSM, GPRS, CDMA, EDGE, UMTS, EvDO, HSPDA, WiMAX, or a variety of others. It will be appreciated that the mobile device 100 may roam within the PLMN 50 and across PLMNs, in known manner, as the user moves.

The IP network 20 may also provide one or more wireless access points 70. The wireless access points 70 provide wireless local area network (WLAN) connectivity to mobile devices 100 within the enterprise campus. The wireless access points 70 may be configured in accordance with one of the IEEE 802.11 specifications. The mobile device 100 may be equipped with a suitable antenna, RF transceiver, and software for accessing and using the WLAN connectivity of the wireless access point 70, i.e. the mobile device 100 may be "Wi-Fi enabled". In this manner the mobile device 100 may establish an IP connection with the LAN 20 enabling relatively fast data communication.

The IP network 20 includes a communications server 60. The communications server 60 is configured to route voice calls and other session-based communications within the IP network. For example, the communications server 60 may be compliant with Session Initiation Protocols (SIP) and may be configured to act as a proxy server a with regard to SIP-capable devices within the IP network 20.

The IP network 20 may also include a gateway 26 having a connection with the PSTN 40. The gateway 26 may include an IP/ISDN interface for converting signaling and media between the two networks. For example, the gateway 26 may be configured to provide conversion between SIP communications on the IP network 20 and ISDN signaling in the PSTN 40. It may also be configured to convert media, such as between VoIP on the IP network 20 and digital circuit-switched connections on the PSTN 40. On one side, the gateway 26 may be connected to the PSTN 40 via, for example, direct inward dialing (DID) trunks. The gateway 26 may use ISDN signaling protocols for establishing and breaking circuit-switched connections through the PSTN 40 and related signaling and communications.

The IP network 20 may include various terminal devices, such as desktop telephone sets, softphones implemented on computers, and/or mobile devices. The communications server 60 together with the gateway 26 may facilitate the routing of voice calls between these various terminal devices and to/from external devices via the PSTN 40, for example. In this regard, the communications server 60 and gateway 26 act as a private branch exchange (PBX) 28, as illustrated in FIG. 2.

Calls outgoing from the PBX 28 to the PSTN 40 or incoming from the PSTN 40 to the PBX 28 are typically digital circuit-switched calls. Within the IP network 20, i.e. between the PBX 28 and terminal devices, calls are typically digital packet-switched calls. In particular, calls over the IP network 20 are VoIP calls. The PBX 28 implements the switching to connect legs and provides the conversion between a circuit-switched call and a packet-switched call. In many embodiments, the PBX 28 provides a number of additional functions including automated attendant, interactive voice response, call forwarding, voice mail, etc. As shown in FIG. 2, the PBX 28 includes a SIP interface 32 for performing SIP messaging over the IP network and an ISDN interface 34 for performing ISDN signaling over the PSTN 40.

It will be appreciated that the dual-mode mobile device 100 is capable of participating in a VoIP call over the IP network (and possibly the WAN 30 or other IP networks) with a remote device 120 (illustrated individually as 120a-120d). The remote device 120 may include a mobile device 120a, a desktop or laptop computer 120b, a telephone terminal device 120c, or remote computer 120d. The remote device 120 is configured for VoIP communications and may, in some embodiments, be SIP-compliant.

Figure 2:
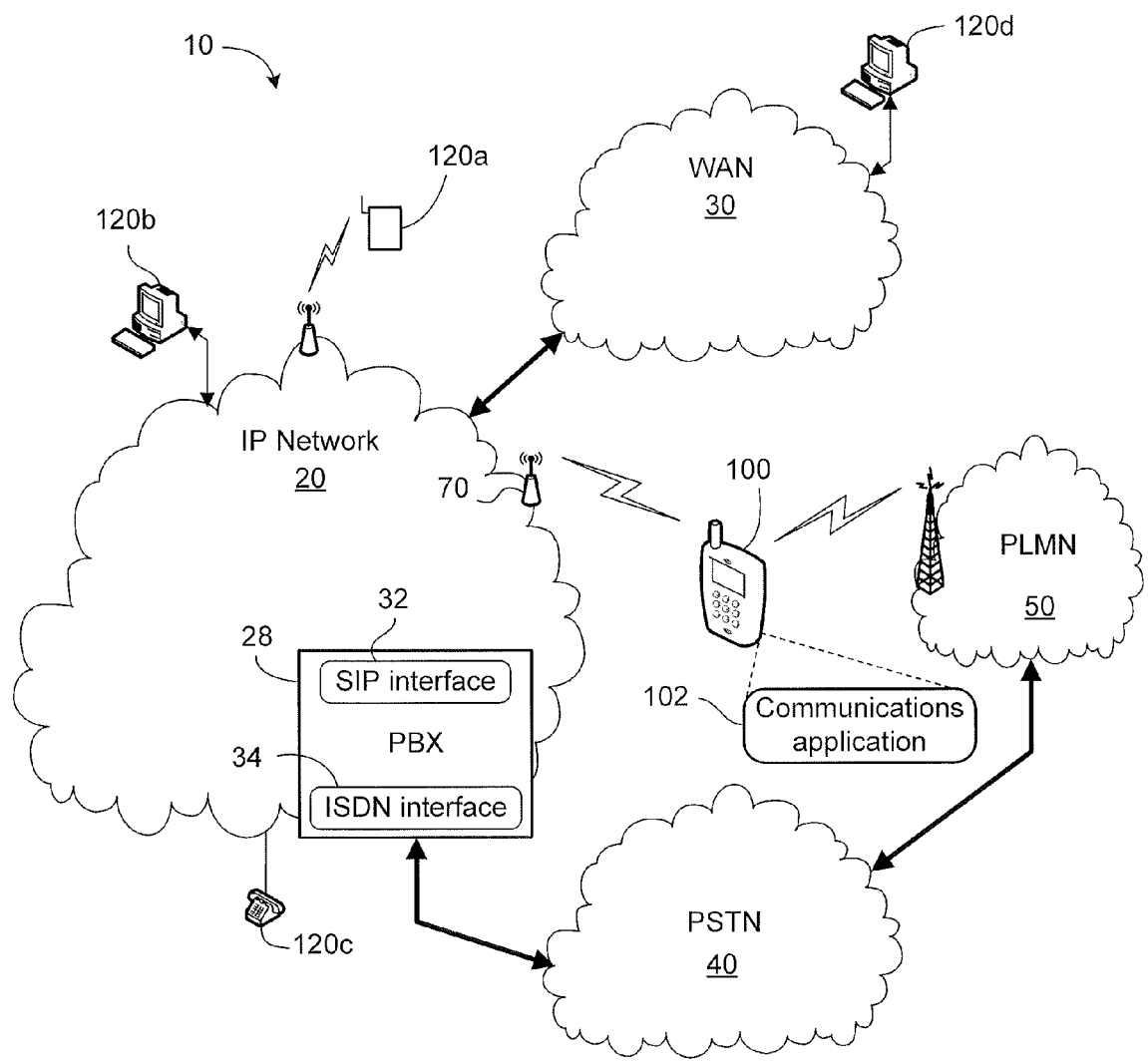
FIG. 2 shows the system of FIG. 1 implemented using a PBX.

Although FIGS. 1 and 2 illustrate the dual-mode mobile device 100 as a handheld mobile device, it will be appreciated from the description below that in some embodiments, the dual-mode device need not be a handheld mobile device and may, in some instances, be a softphone on a desktop computer or laptop computer, or other such device having both VoIP and cellular capabilities.

Many of the example embodiments described below reflect the architecture of FIG. 2 wherein a PBX implements the functions of both the gateway and the communications server. In some embodiments the functions may be divided between a discreet communications server and gateway within the IP network. Accordingly, it will be appreciated that any references herein to a PBX or communications server and the functions they perform in signaling or in handling media paths are not intended to be limited to a specific architecture.

Figure 4:
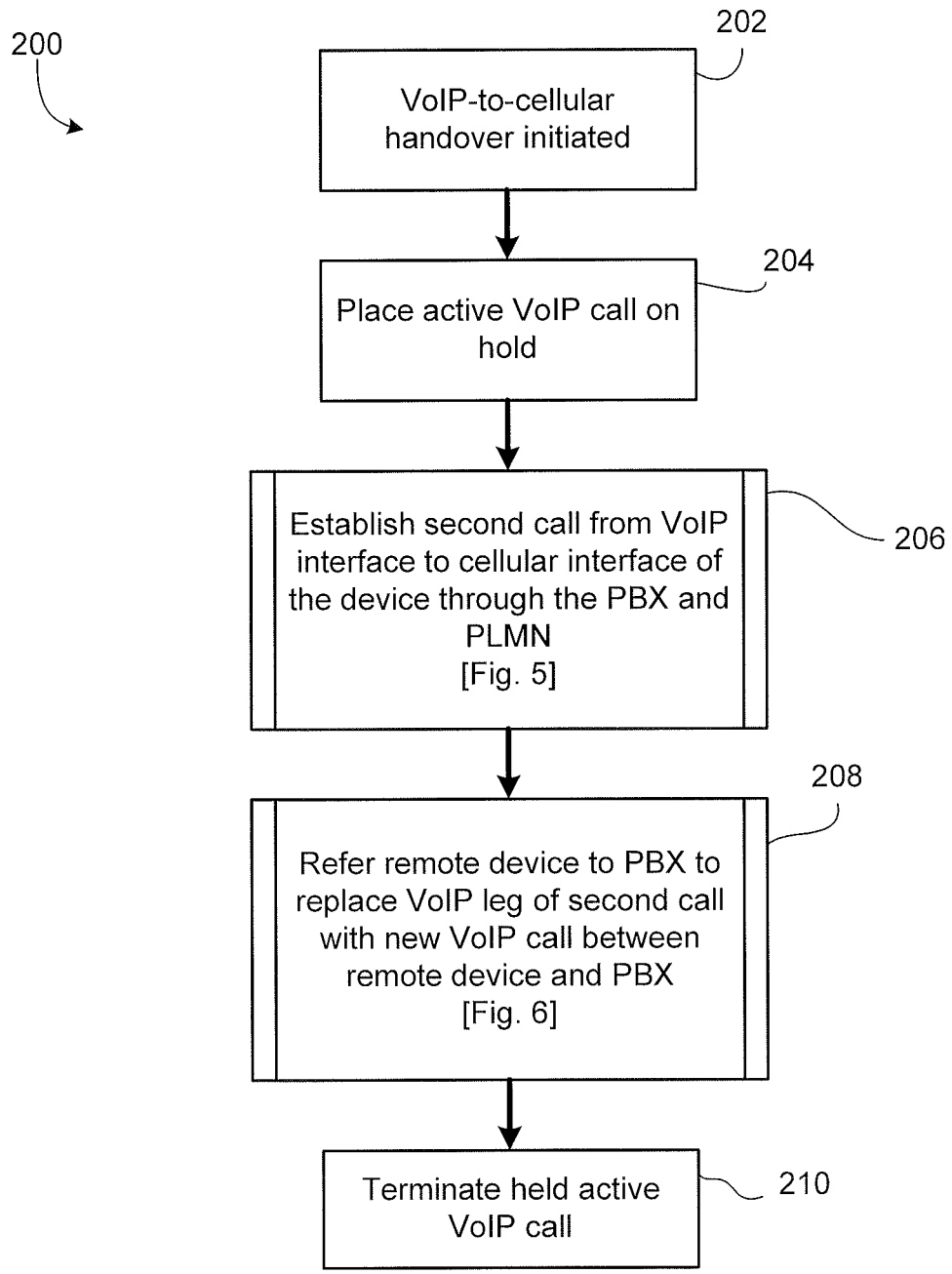
FIG. 4 shows, in flowchart form, an example method for managing the handover of an active call from the VoIP interface to the cellular interface of a dual-mode device.

Reference is now made to FIG. 4, which shows an example method 200 for managing the handover of an active call from the VoIP interface to the cellular interface of a dual-mode device. The method 200 begins in step 202 with initiation or triggering of the handover. The handover relates to an existing active VoIP call, which may be referred to as the first call or Call 1, between the dual-mode device and a remote device. As illustrated in FIGS. 1 and 2, the remote device 120 may be local to the IP network 20, or may be connected to a remote WAN 30 reachable through the IP network 20. The remote device 120 is a VoIP-capable SIP-compliant device.

The decision to handover the active VoIP call to the cellular interface of the dual-mode device may be made manually or automatically. In one example embodiment, the user of the dual-mode device manually selects a "handover" option for triggering the handover. This may occur if the user is aware that he or she is roaming out of a WLAN coverage area, such as an enterprise facility or campus, and wishes to switch the active call over the cellular interface. In this example embodiment, the communications application may provide a "handover" option on the user interface, such as menu option, which the user can select during an active VoIP call.

In another example embodiment, the handover decision may be made automatically by the dual-mode device. The decision may be made based on any of a number of factors. For example, the device may determine that it is leaving the WLAN coverage area and may, therefore, decide to switch an active VoIP call to the cellular interface. The device may determine that it is leaving the coverage area in any of a number of ways, including signal strength detection, triangulation and coverage map correlation, border access point recognition, or other mechanisms. The precise mechanism for triggering the handover decision on the dual-mode device, be it manual or automatic, is not germane to the present application and it will be appreciated that any suitable mechanism may be used.

In step 204, the dual-mode device may place the active VoIP call on hold.

While the active VoIP call is on hold, in step 206 the device establishes a second call, referred to as Call 2, from its VoIP interface to its cellular interface. In other words, the device calls itself. The call is initiated as a VoIP call, using a call request instruction or message to the PBX. The PBX causes a cellular call to be placed, through its gateway to the PSTN, via the PLMN, to the cellular number of the dual-mode device.

When the incoming cellular call arrives at the cellular interface of the dual-mode device, the call is answered by the device. The communications application on the device does not generate a standard user alert regarding the incoming call. That is to say, the call does not audibly ring on the device and the GUI does not indicate the incoming call to the user. As will be described below in connection with FIG. 5, the device may take steps to confirm that the incoming cellular call originates from the VoIP interface of the device and is not from a third party.

Step 206 results in the establishment of Call 2, which includes a VoIP leg from the VoIP interface to the gateway in the IP network and a cellular leg from the gateway to the cellular interface of the device via the PLMN and PSTN.

In step 208, the dual-mode device instructs the remote device to join Call 2 by connecting to the gateway. In particular, the dual-mode device sends a referral message with instruction to replace the VoIP call leg of Call 2 with a new VoIP call leg between the PBX and the remote device. On receipt of these instructions, examples of which will be described below, the remote device contacts the PBX to establish a new VoIP call leg between the remote device and the PBX, which is connected to the cellular call leg of Call 2 in place of the VoIP leg between the PBX and the dual-mode device. In this manner, the remote device is shuffled into Call 2 in place of the dual-mode device VoIP interface and, thus, the remote device is connected to the cellular interface of the dual-mode device.

In step 210, the original VoIP call between the dual-mode device and the remote device that was placed on hold in step 204 is terminated.

Figure 5:
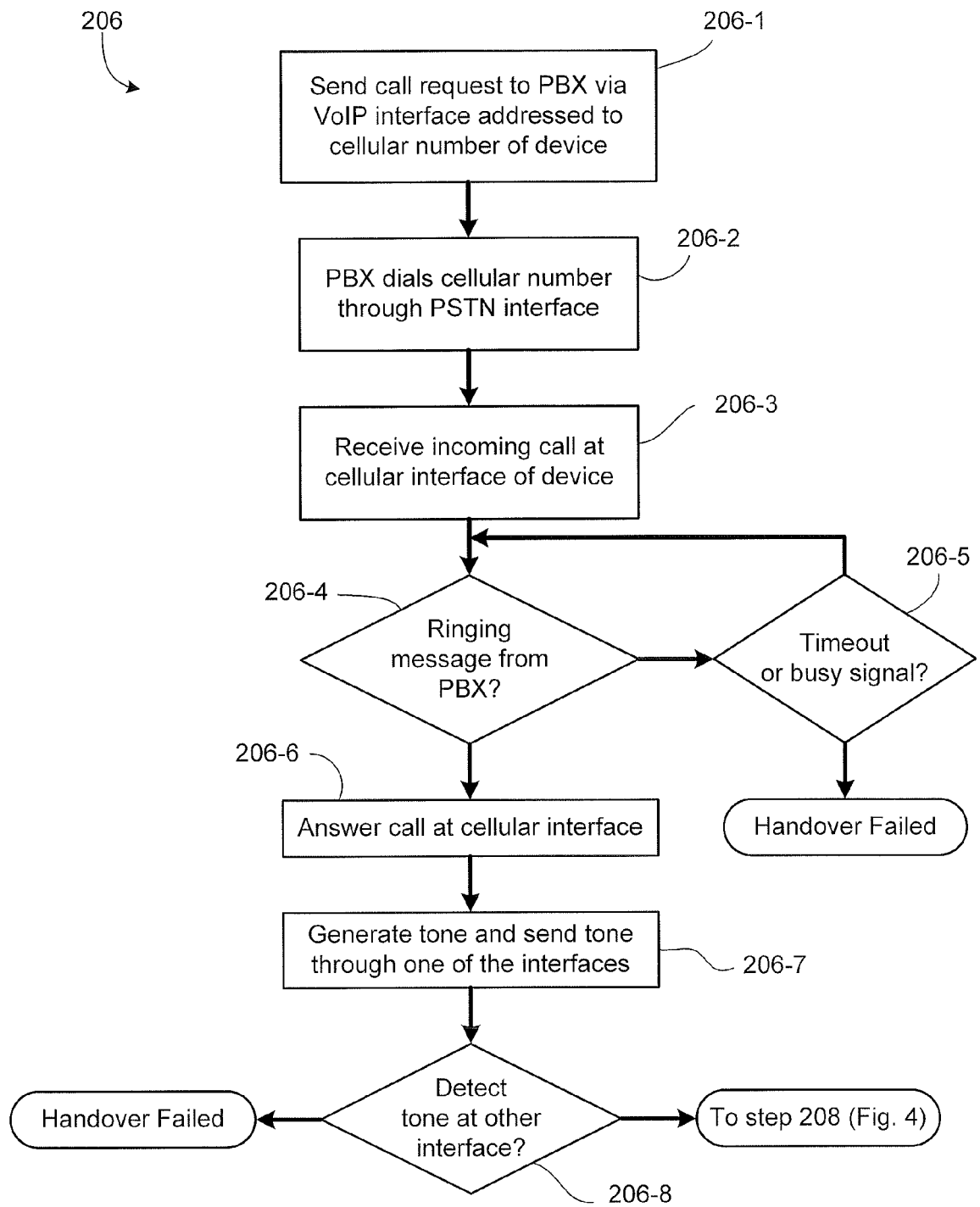
FIG. 5 shows, in flowchart form, an example method for establishing the second call in step of FIG. 4.

Reference is now made to FIG. 5, which shows, in flowchart form, an example method for establishing the second call in step 206 of FIG. 4.

The example begins with step 206-1, wherein the dual-mode device sends a call request to the PBX in the IP network via its VoIP interface. The call request is addressed to the cellular number, e.g. the dual-mode device's mobile telephone number. The call request may, in some embodiments, comprises a SIP INVITE message. Details of one SIP-specific embodiment are given below in connection with FIGS. 7 to 9.

The PBX receives the call request and, in step 206-2 it calls the cellular number via the PSTN/PLMN. In some embodiments, this may comprise instructing the IP/PSTN gateway to dial the cellular number to initiate the cellular call. In an example embodiment in which the PBX comprises a distinct communications server and IP/PSTN gateway, the communication server instructs the IP/PSTN gateway to place the outgoing cellular call to the dual-mode device.

In step 206-3, the dual-mode device receives an incoming cellular call at its cellular interface. This incoming call may be the call placed by the VoIP interface of the device; however, circumstances may arise where the call is from a third party placing an ordinary cellular call to the dual-mode device that arrives just prior to the call from the VoIP interface. In those circumstances, the dual-mode device risks answering the wrong call in the context of the handover procedure. Accordingly, the dual-model device requires a mechanism for determining whether the incoming call signal received at step 206-3 is from its VoIP interface or not.

In one embodiment, the dual-mode device may be configured to determine whether the incoming call is from its VoIP interface based on caller identification information in the received incoming call signal. The device compares the caller identification information with its own VoIP identity information to determine whether the incoming call is the correct one. In some embodiments, this may suffice; however, in some cases the caller identification information may be inadequate. First, many dual-mode device users may not subscribe to the caller identification (CID) service from the PLMN operator. In many instances, the CID service is optional and is not always available. Second, in many embodiments, the IP network is an enterprise network and the VoIP interface of the dual-mode device corresponds to a user enterprise extension number. Many CID services do not pass on extension information, meaning that the CID information in the incoming call request may only reflect the general PBX/enterprise number, and not the user VoIP extension. In this case, the device cannot distinguish from its own incoming call and an incoming cellular call from another enterprise user.

Accordingly, in step 206-4 the device assesses whether it has received a "ringing" message from the PBX. When the cellular call is placed through the PLMN to the cellular interface of the dual-mode device, the PBX receives an ISDN signal indicating that the call request has been delivered to the device and is awaiting a response. The PBX sends a message, such as a SIP 180 RINGING message, to the VoIP interface of the device confirming that the call request is ringing through. In this manner, the device knows that the incoming call ringing on its cellular interface is its own call. If it has not received a "ringing" indication through its VoIP interface in step 206-4, the device assesses whether it has received a busy signal or whether its request has timed out in step 206-5. In either instance, if a busy signal is received or the request times out, then the handover fails and the device may retry the handover and/or may indicate to the user that the handover failed. The device may conclude that the incoming call thus relates to a third party call and may deal with it accordingly, including presenting the incoming call to the user so that the user can decide whether to accept the third party call.

If a ringing message is received in step 206-4, then in step 206-6, the incoming cellular call is answered to complete a call connection, Call 2, between the VoIP interface and the cellular interface via the IP network, PBX/gateway, and PLMN.

In some embodiments, the PBX 28 may be configured to send a SIP 18*x* response to the dual-mode device 100 without receiving confirmation from the PLMN that the receiving device is being alerted to the incoming call request. Accordingly, in some embodiments a further mechanism may be required to confirm that the incoming call at the cellular interface is from the VoIP interface. One example mechanism is illustrated in steps 206-7 and 206-8. In one example, steps 206-7 and 206-8 may be addition to steps 206-4 and 206-5; however, in one example, steps 206-7 and 206-8 are used instead of steps 206-4 and 206-5.

In step 206-7, the dual-mode device generates a predetermined tone and sends the tone through either the cellular interface or the VoIP interface over Call 2. The tone may be a DTMF frequency, but not necessarily. The tone is a unique indicator or identifier that may be detected at the other interface of the device to determine or confirm that the interfaces are connected through Call 2. Step 206-8 reflects the detection of the tone at the other interface. If the tone is not detected, then the handover may be deemed to have failed. In this case, the cellular call is terminated. It will be appreciated that this may result in answering and then quickly dropping a third party cellular call, although this is likely to be a very rare occurrence.

If the tone is correctly detected in step 206-8, then Call 2 has been correctly established and the process goes on to step 208 of FIG. 4.

Figure 6:
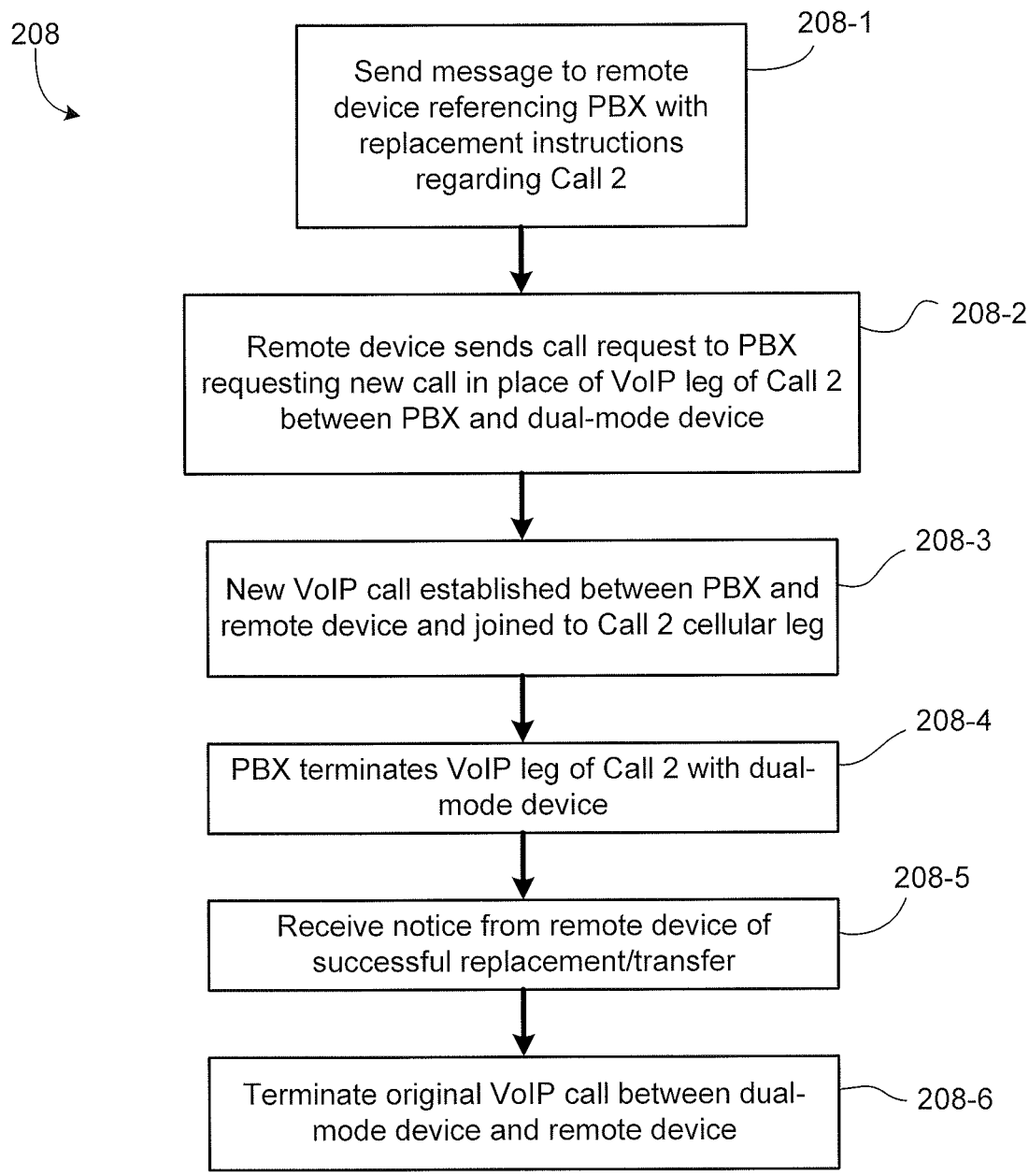
FIG. 6 shows, in flowchart form, an example method for referring the remote device to the gateway/PBX in step 208 of FIG. 4.

FIG. 6 shows, in flowchart form, an example method for referring the remote device to the gateway/PBX in step 208 of FIG. 4.

The example begins with step 208-1, in which the dual-mode device sends a referral message to the remote device with information regarding the PBX. The referral message includes a replacement instruction referencing Call 2 and indicating that the remote device should establish a VoIP call with the PBX in place of the VoIP leg of Call 2 between the PBX and the dual-mode device.

In step 208-2, the remote device receives the referral message and, in response to it, sends a call request to the PBX. The call request to the PBX references Call 2 and indicates that the new call request is to replace the VoIP leg from the PBX to the dual-mode device for Call 2.

In step 208-3, the new call leg between the PBX and the remote device is established and joined to the cellular leg of Call 2. Then in step 208-4, the VoIP leg of Call 2 between the PBX and the dual-mode device is terminated. Thus, the remote device is now connected to the cellular interface of the dual-mode device. The dual-mode device receives notice of the successful referral and replacement operation from the remote device in step 208-5. In response, the dual-mode device then terminates the held original VoIP call with the remote device in steps 208-6.

These foregoing steps may be implemented, in some embodiments, using a call transfer messaging protocol. In one example embodiment, the call transfer messaging protocol comprises the Attended Transfer mechanism described in Session Initiation Protocol Service Examples, draft-ietf-sipping-service-examples-12, Jan. 23, 2007, published by the IETF SIPPING Working Group. An example SIP-based implementation of this referral/replacement operation is described below in connection with FIG. 9.

Figure 7:
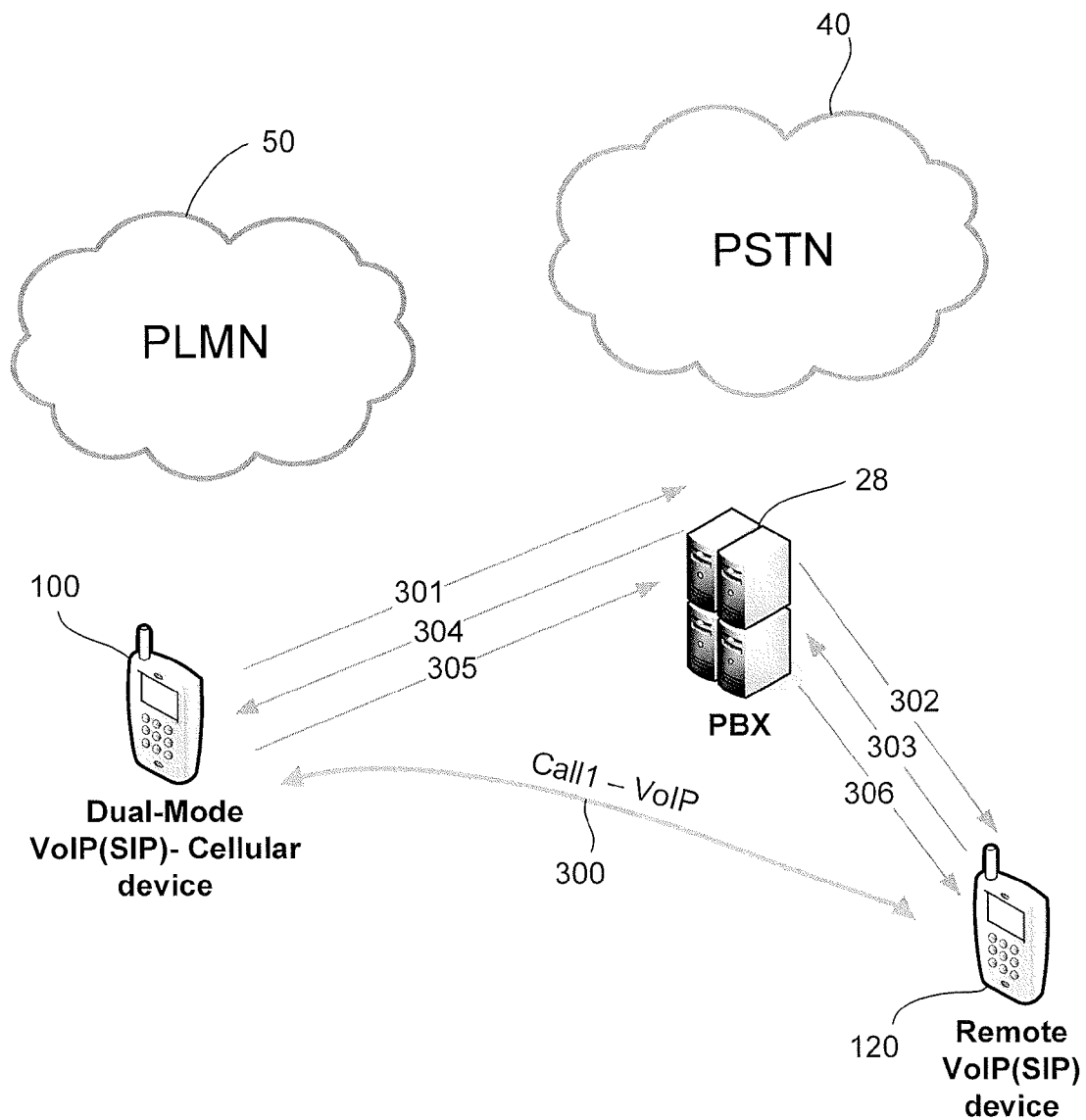
FIGS. 7 to 9, which illustrate an example call flow for a SIP-based implementation of the method from FIG. 4.
Figure 8:
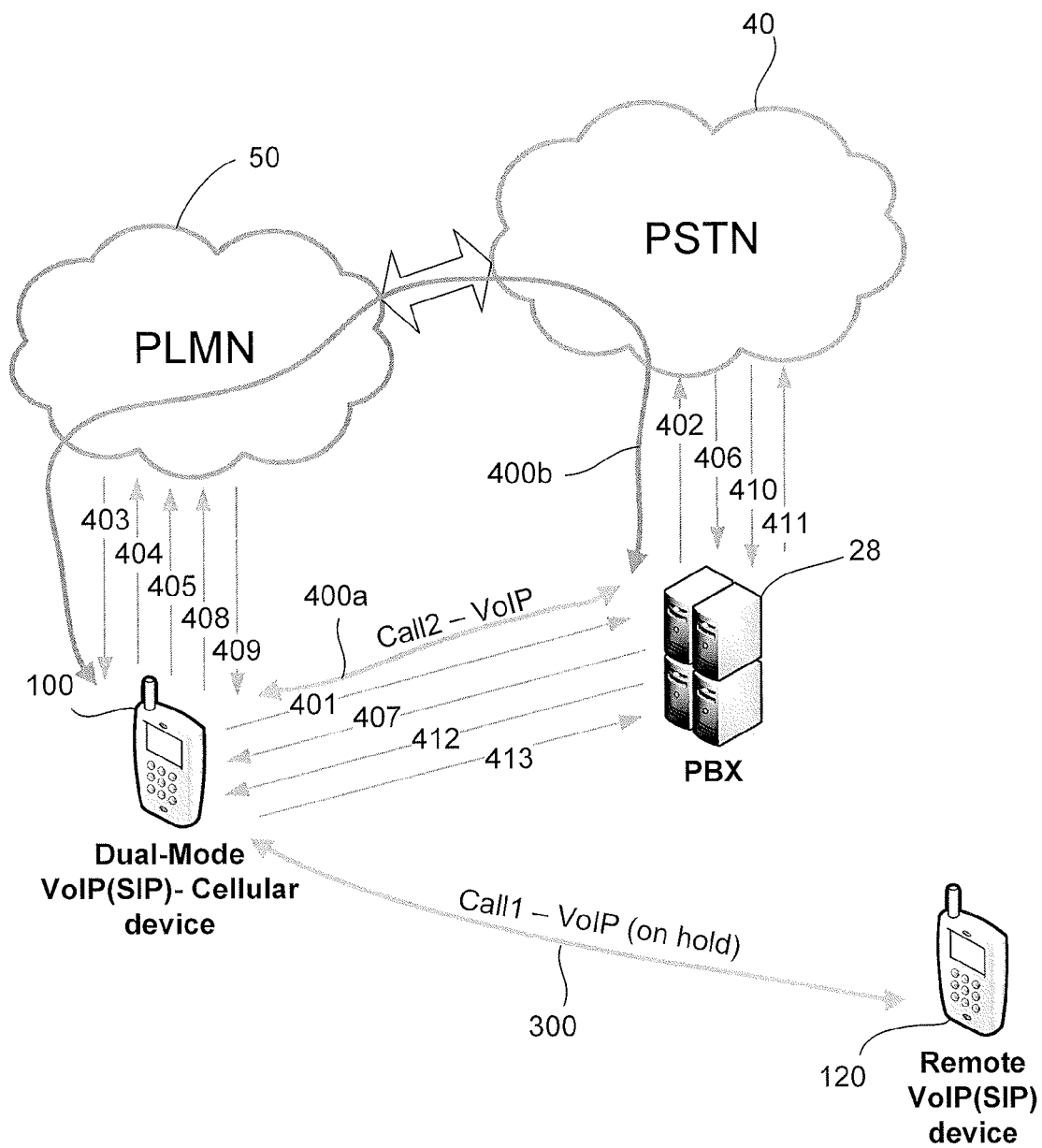
Figure 9:
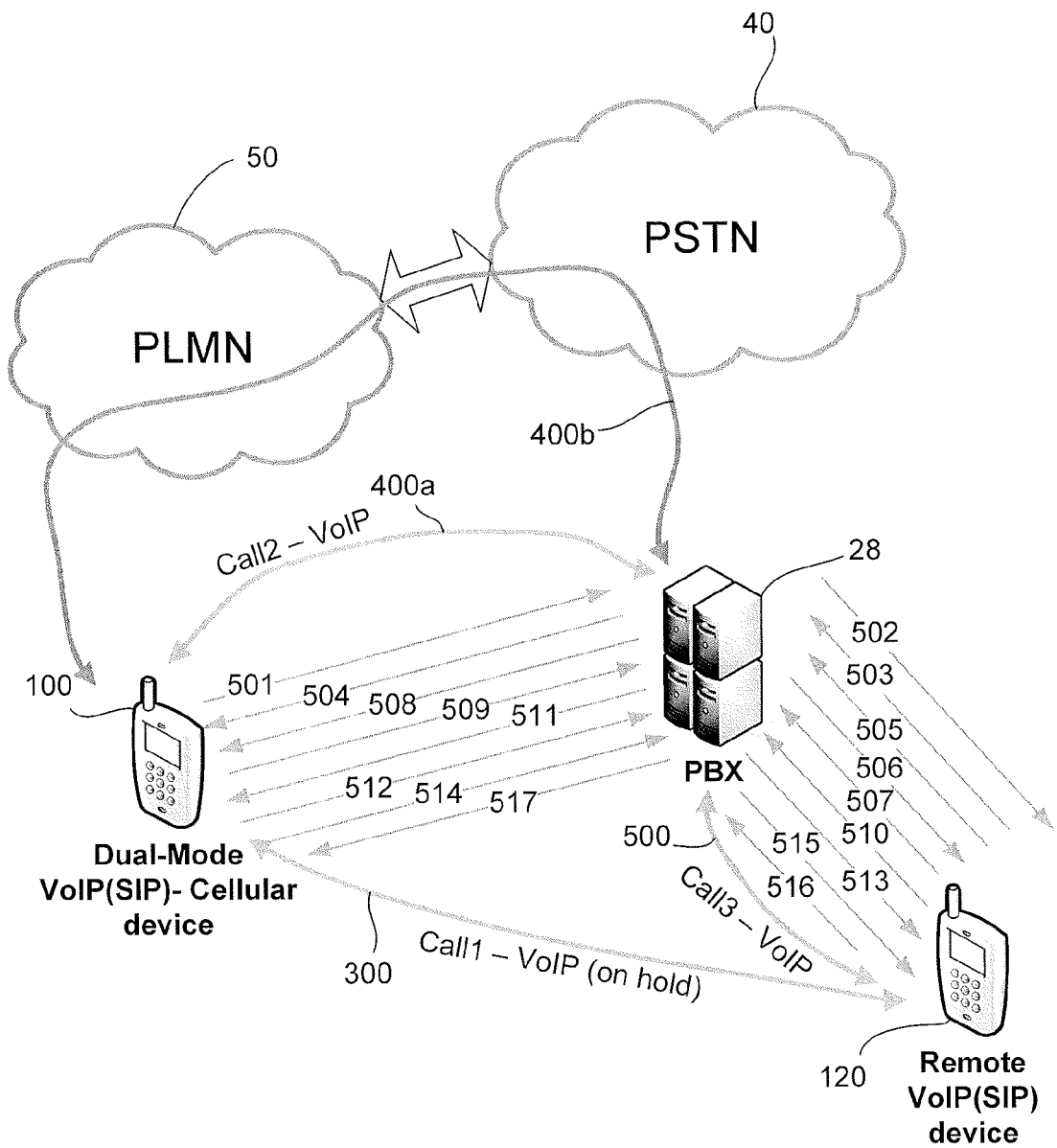

Reference is now made to FIGS. 7 to 9, which illustrate an example call flow for a SIP-based implementation of the method 200 from FIG. 4. In this example, the dual-mode device 100 and the remote device 120 are illustrated as mobile handheld devices, but it will be appreciated that they need not be. The devices 100, 120 are SIP-compliant.

An existing VoIP call 300, Call 1, has been established between the dual-mode device 100 and the remote device 120, as shown in FIG. 7.

The handover call flow begins in FIG. 7 with a SIP INVITE hold request message 301 sent by the dual-mode device 100 to the PBX 28 within the existing call dialog for Call 1. The PBX 28 forwards the hold request to the remote device 120 as message 302. The remote device 120 responds with a SIP 200 OK message 303, which is relayed by the PBX 28 to the dual-mode device 100 as SIP 200 OK message 304. The dual-mode device 100 concludes the dialog change with an ACK message 305 to the PBX 28, which also sends an ACK message 306 to the remote device 120. This exchange results in Call 1 being put on hold.

Referring now to FIG. 8, the call flow is illustrated for establishing the second call 400 (shown individually as VoIP call leg 400*a* and cellular call leg 400*b*). The call flow begins with transmission of a SIP INVITE message 401 to the PBX 28 requesting a voice call and addressed to the cellular interface (e.g. mobile telephone number) of the dual-mode device 100. The PBX 28 sends an ISDN call setup message 402, which is routed through the PSTN 50 and PLMN 50 in known manner, and results in, for example, a GSM incoming call setup message 403. The precise messaging protocol used by the PLMN 50 depends on the type of wireless network. The present application is not restricted to any particular PLMN protocol.

The dual-mode device 100 responds to the call setup message 403 by sending a GSM call processing message 404, followed by a GSM Alerting message 405. The dual-mode device 100 is configured to send the GSM Alerting message 405 despite the fact that it is not alerting the user to the incoming call. The device 100 refrains from alerting the user to this incoming call on the basis that the device 100 is an a Waiting for Handover state.

The GSM Alerting message 405 results in a corresponding alerting message 406 being delivered to the PBX 28. In some example embodiments, the alerting message 406 may be an ISDN progress message. On receiving this confirmation that the call is ringing through, the PBX 28 sends the dual-mode device 100 a SIP 180 RINGING message 407.

The dual-mode device 100 awaits receipt of the SIP 180 RINGING message 407. Once it is received, the device 100 answers the incoming call with a GSM connect message 408. The PLMN 50 returns a GSM connect acknowledge message 409. At the PBX 28 an ISDN connect message 410 is received and the PBX 28 returns an IDSN connect acknowledge message 411. The circuit-switched cellular leg 400b of Call 2 is now established between the cellular interface of the device 100 and the PBX 28.

The PBX 28 then sends a SIP 200 OK message 412 to the dual-mode device 100 and receives an ACK message 413 in return. The VoIP leg 400b of the second call 400 is now established, completing the connection between the VoIP interface of the device 100 and the cellular interface of the device 100.

The device 100 may, at this point, test for connectivity using the tone generation/detection mechanism described above in connection with FIG. 5.

Reference is now made to FIG. 9, which illustrates an example call flow for completing the handover. The handover occurs by creating a new VoIP call 500, Call 3, between the remote device 120 and the PBX 28 and replacing the VoIP call leg 400b of Call 2 with the new VoIP call 500. The dual-mode device 100 causes this to occur by way of the SIP REFER method illustrated in FIG. 9.

The call flow begins with the dual-mode device 100 sending a SIP REFER message to the remote device 120 on the Call 1 dialog, as shown by messages 501 and 502. The SIP REFER message contains dialog information for Call 2 and a REPLACE instruction/header. The remote device 120 responds with a 202 Accepted message, as shown by messages 503 and 504. The remote device 120 then generates a SIP INVITE message 505 addressed to the PBX 28. The SIP INVITE message 505 contains a replace header indicating that the requested session is to replace the VoIP leg of Call 2. The PBX 28 responds with a 200 OK message 506 and the remote device 120 replies with an ACK message 507. Thus, the new VoIP call 500 is established between the remote device 120 and the PBX, and the new VoIP call 500 is joined or bridged to the cellular leg 400b of Call 2.

Because the INVITE message 505 contained a replace instruction, the PBX 28 then sends a SIP BYE message 508 to the VoIP interface of the dual-mode device 100 on the Call 2 dialog. The dual-mode device 100 responds with a 200 OK message 509 and the transfer is effectively completed. The remote device 120 sends a SIP NOTIFY message on the Call 1 dialog confirming that the transfer was successful, as indicated by messages 510 and 511. The dual-mode device 100 then sends a SIP 200 OK 512, 513.

Now that the remote device 120 has been connected to the cellular interface of the dual-mode device 100, the dual-mode device 100 terminate the original VoIP call 300, Call 1, with a SIP BYE message 514, 515, in response to which it receives a 200 OK 516, 517 from the remote device 100.

It will be appreciated that the foregoing call flows may omit some notification messages or other routine messaging or signaling. Those skilled in the art will also appreciate that the call flows may be modified or adjusted in various embodiments without materially impacting operation of the handover.

In yet another embodiment, if the dual-mode device 100 is capable of handling three media flows, Call 1 (the original VoIP call) can be put on hold after Call 2 (the cellular call) is established, but before performing the "referral" process. In this embodiment, the VoIP interface would be handling both the incoming call media and the media for the outgoing call to the device's cellular interface.

Figure 3:
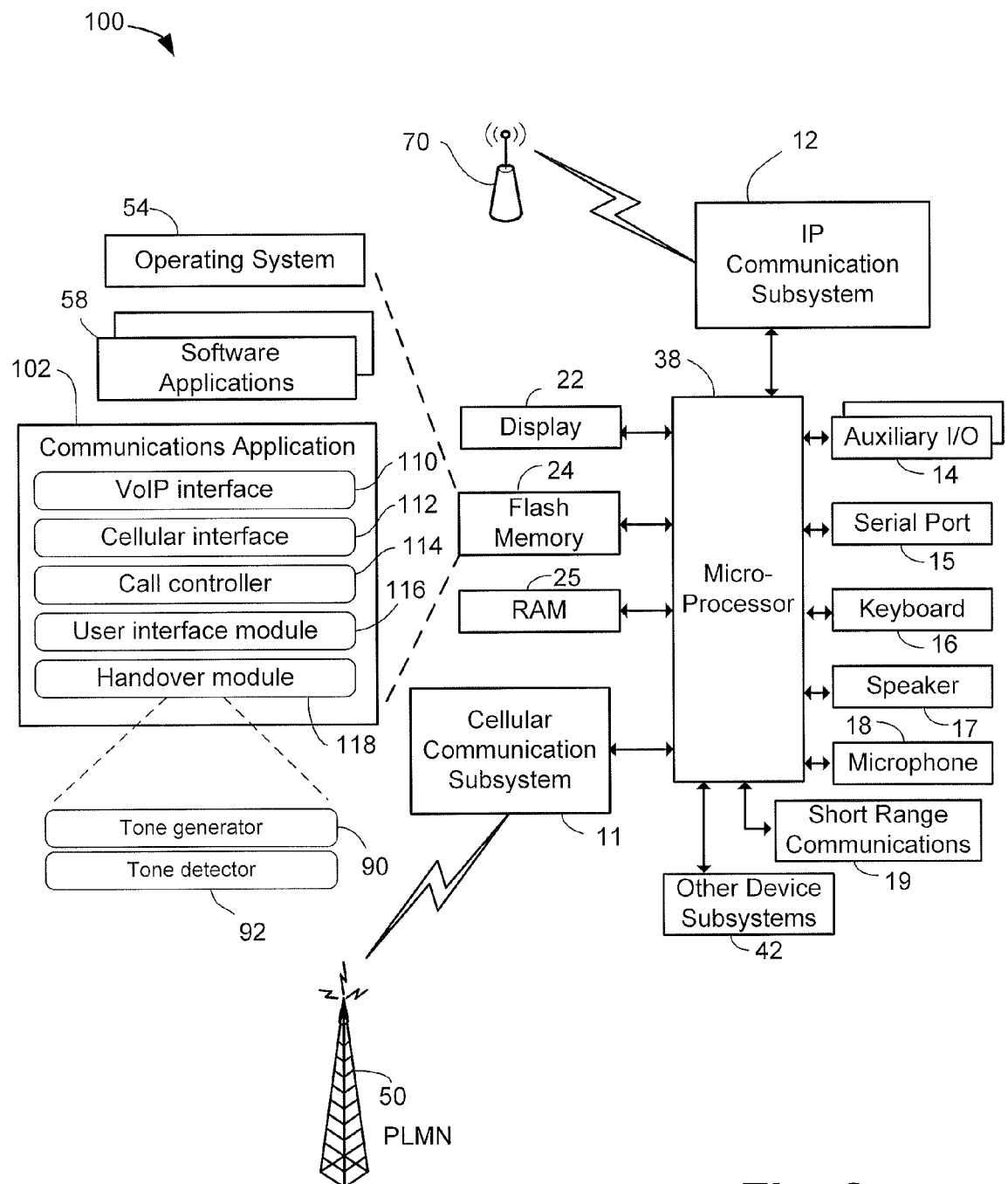
FIG. 3 shows a block diagram of an example embodiment of a dual-mode device.

Reference is now made to FIG. 3, which shows a block diagram of an example embodiment of a dual-mode device 100. In some embodiments, the dual-mode device 100 is a two-way, electronic communications device having data and voice communication capabilities. In at least one example embodiment, the dual-mode device 100 has the capability to exchange messages with other devices and computer systems.

The dual-mode device 100 includes a cellular communication subsystem 11. In one embodiment, the communication subsystem 11 may include a receiver, a transmitter, and associated components such as one or more antenna elements, and a processing module such as a digital signal processor (DSP). As will be apparent to those skilled in the field of communications, the particular design of the cellular communication subsystem 11 will be dependent upon the cellular communication network(s) in which the device 100 is intended to operate.

Signals received by the device 100 from a cellular communication network, such as PLMN 50, are input to the receiver of the cellular communication subsystem 11, which may perform such common receiver functions as signal amplification, frequency down-conversion, filtering, channel selection and the like. In a similar manner, signals to be transmitted are processed, including modulation and encoding for example, by the DSP and input to the transmitter for digital-to-analog conversion, frequency up-conversion, filtering, amplification and transmission over the PLMN 50.

The device 100 also includes an IP communications subsystem 12. The IP communications subsystem 12 facilitates IP connectivity with an IP network for exchanging IP communications. In one embodiment, the IP communications subsystem 12 may include a network card for connecting the device 100 to an Ethernet network, or other IP network. In another embodiment, the IP communications subsystem 12 may include a WiFi card, and associated circuitry, including a suitable antenna and radio transceiver, for achieving wireless connectivity with the WLAN access point 70.

The dual-mode device 100 includes a microprocessor 38 that controls the overall operation of the device. The microprocessor 38 interacts with the cellular communications subsystem 11 and IP communications subsystem 12, and also interacts with further device subsystems such as flash memory 24, random access memory (RAM) 25, auxiliary input/output (I/O) subsystems 14, serial port 15, keyboard or keypad 16, speaker 17, microphone 18, a short-range communications subsystem 19, and any other device subsystems generally designated as 42.

Operating system software 52 and various software applications 54 executed by the microprocessor 38 are, in one example embodiment, stored in a persistent store such as flash memory 24 or similar storage element. Those skilled in the art will appreciate that the operating system 52, software applications 54, or parts thereof, may be temporarily loaded into a volatile store such as RAM 25.

The microprocessor 38, in addition to its operating system functions, enables execution of software applications 54 on the device 100. A predetermined set of software applications 54 which control basic device operations, including data and voice communication applications for example, will normally be installed on the dual-mode device 100 during manufacture. Further software applications 54 may also be loaded onto the device 100 through the PLMN 50, the IP communications subsystem 12, an auxiliary I/O subsystem 14, serial port 15, short-range communications subsystem 19, or any other suitable subsystem 42, and installed by a user in the flash memory 24, the RAM 25 or a non-volatile store for execution by the microprocessor 38.

Included among the software applications 54 on the device 100 is the communications application 102. Although the communications application 102 is depicted as discreet software for the purposes of this description, it may be incorporated into other software, including the operating system 54. In some embodiments, the communications application 102 may be two or more separate software applications.

The communications application 102 includes a VoIP interface 110 and a cellular interface 112. The VoIP interface 110 represents the software modules and components for sending and receiving IP communications via the IP communications subsystem 12. In particular, the VoIP interface 110 includes the software modules and components for facilitating a voice call. For example, the VoIP interface 110 may manage the receipt and sending of RTP packets over UDP. In one embodiment, the VoIP interface 110 is configured to employ SIP communications for setting up, managing, and tearing down sessions for voice calls.

The cellular interface 112 represents the software modules and components for sending and receiving voice communications via the cellular communication subsystem 11. In particular, the cellular interface 112 includes the software modules and components for managing the receipt and sending of audio communications conforming to one or more cellular protocols, such as, for example, GSM. The cellular interface 112 may perform encoding and decoding of audio media, and may engage in signaling with the PLMN 50 to set-up, manage, and tear down voice calls.

It will be appreciated that aspects of the VoIP interface 110 and/or the cellular interface 112 may be implemented within the IP communication subsystem 12 and cellular communication subsystem 11, respectively.

The communications application 102 may include a user interface module 116 for interacting with the user to present call information on the display 22 and to receive user input via the keyboard 16 or other auxiliary I/O 14 to initiate, manage, or terminate voice calls.

The communications application 102 may also include a call controller 114 configured to control the VoIP interface 110, the cellular interface 112, and the user interface module 116. For example, in one embodiment, the call controller 114 determines whether a requested call should be initiated using the VoIP interface 110 or the cellular interface 112. In another embodiment, the call controller 114 determines whether to switch an active VoIP call from the VoIP interface 110 to the cellular interface 112, as described above. The decision to switch from VoIP to cellular may be automated, in that the call controller 114 determines whether to switch a call based on various measurements, characteristics or parameters accordingly to a predetermined rule set. The decision may also or alternatively be based on a user input indicating that the user wished to switch the VoIP call to cellular.

The communications application 102 may further include a handover module 118 for managing the handover of an active VoIP call to the cellular interface 112. It will be appreciated that the handover module 118, although depicted discreetly, may form a part of the call controller 114. The handover module 118 may manage the process of initiating a call from the VoIP interface 110 to the cellular interface 110, causing the remote party 120 (FIG. 1) to be referred to the PBX 28 (FIG. 2), and terminating the old VoIP call.

In one embodiment, the handover module 118 may include a tone generator 90 and tone detector 92 for generating a tone and detecting a tone, respectively, as described above in connection with FIG. 5. Although depicted in FIG. 3 as software modules within the communications application 102, it will be appreciated that the tone generator 90 and tone detector 92 may be implemented wholly or partly through hardware in the IP communications subsystem 12 or cellular communication subsystem 11. For example, existing DTMF tone generation and detection capability within the communication subsystems 12, 11 may be leveraged by the handover module 118 to realize, at least in part, the functions of tone generation and detection. Other variations will be appreciated by those ordinarily skilled in the art.

Certain adaptations and modifications of the described embodiments can be made. Therefore, the above discussed embodiments are considered to be illustrative and not restrictive.

What is claimed is:

1. A method of handing over an active call between a dual-mode device and a remote device, wherein the dual-mode device includes a Voice-over-Internet Protocol (VoIP) interface for wireless communications over an IP network and a cellular interface for wireless communications over a public land mobile network (PLMN), wherein the IP network includes a communications server, and wherein the active call is a VoIP call using the VoIP interface of the dual-mode device, the method comprising the steps of:

managing the handing over by placing the active call on hold;

the dual-mode device establishing a second call from the VoIP interface to the cellular interface of the dual-mode device via the communications server and the PLMN, wherein the second call includes a VoIP leg from the VoIP interface of the dual-mode device to the communications server;

the dual-mode device instructing the remote device to initiate a new call to the communications server referencing the second call and causing the communications server to replace the VoIP leg of the second call with the new call, thereby joining the remote party to the second call connected to the cellular interface of the dual-mode device; and terminating the active call.

2. The method claimed in claim 1, wherein the step of establishing comprises:

sending a call request from the VoIP interface to the communications server with instructions to place a call to the cellular interface via the PLMN;

receiving an incoming call through the cellular interface via the PLMN;

receiving confirmation from the communications server through the VoIP interface in response to the call request indicating the placed call is ringing; and answering the incoming call to establish the second call.

3. The method claimed in claim 2, further including steps of:

sending a tone in the second call through one of the cellular interface and the VoIP interface; and if the tone is not detected in the other of the cellular interface and the VoIP interface, then ending the second call, and if the tone is detected then performing the steps of instructing and terminating.

4. The method claimed in claim 2, wherein said step of sending a call request comprises sending a SIP (Session Initiation Protocol) INVITE message to the communications server addressed to a cellular telephone number of the dual-mode device, and wherein receiving confirmation from the communications server comprises receiving a SIP 180 RINGING message in response to the SIP INVITE message.

5. The method claimed in claim 1, wherein the step of instructing comprises an Attended Transfer process.

6. The method claimed in claim 1, wherein the step of instructing comprises sending a SIP REFER message to the remote device, wherein the SIP REFER message references dialog information for the second call and includes a REPLACE header referencing the second call, receiving a SIP BYE message from the communications server with regard to the VoIP leg of the second call, and receiving a SIP NOTIFY message from the remote device confirming successful transfer of the VoIP leg of the second call to the new call.

7. The method claimed in claim 1, wherein the VoIP call comprises a SIP VoIP call, and wherein the step of placing the call on hold comprises sending a SIP INVITE HOLD request to the communications server, and wherein the step of establishing the second call comprises sending a SIP INVITE request containing a cellular number of the dual-mode device.

8. The method claimed in claim 1, wherein the communications server comprises a private branch exchange (PBX) having a PSTN interface and a SIP-capable IP interface.

9. The method claimed in claim 1, wherein the communications server comprises a private branch exchange (PBX) having a PSTN (Public Switched Telephone Network) interface and a SIP-capable IP interface.

10. A dual-mode device configured for IP-based communication over an IP network and cellular wireless communication over a public land mobile network (PLMN), the IP network including a communications server, the dual-mode device comprising:
- a cellular communications subsystem and a cellular interface for engaging in cellular wireless communications over the PLMN;
- an IP communication subsystem and a Voice-over-IP (VoIP) interface for engaging in IP-based voice communications over the IP network;
- a processor for controlling the communication subsystems; and
- a communications application executable by the processor and configured to manage the handover of an active VoIP call between the dual-mode device and a remote device from the VoIP interface and the cellular interface, the communications application including a handover module configured to:
  - place the active call on hold,
  - establish a second call from the VoIP interface to the cellular interface of the dual-mode device via the communications server and the PLMN, wherein the second call includes a VoIP leg from the VoIP interface of the dual-mode device to the communications server,
  - instruct the remote device to initiate a new call to the communications server referencing the second call and cause the communications server to replace the VoIP leg of the second call with the new call, thereby joining the remote party to the second call connected to the cellular interface of the dual-mode device, and terminate the active call.

11. The dual-mode device claimed in claim 10, wherein the handover module is further configured to establish the second call by sending a call request from the VoIP interface to the communications server with instructions to place a call to the cellular interface via the PLMN, receiving an incoming call through the cellular interface via the PLMN, receiving confirmation from the communications server through the VoIP interface in response to the call request indicating the placed call is ringing, and answering the incoming call to establish the second call.

12. The dual-mode device claimed in claim 11, wherein the dual-mode device further includes a tone generator configured to send a tone in the second call through one of the cellular interface and the VoIP interface and a tone detector configured to detect said tone at the other of the cellular interface and the VoIP interface, and wherein the handover module is configured to end the second call if the tone is not detected.

13. The dual-mode device claimed in claim 11, wherein the handover module is configured to send a SIP INVITE message to the communications server addressed to a cellular telephone number of the dual-mode device, and receive a SIP 180 RINGING message in response to the SIP INVITE message.

14. The dual-mode device claimed in claim 10, wherein the handover module is configured to instruct the remote device in accordance with an Attended Transfer process.

15. The dual-mode device claimed in claim 10, wherein the handover module is configured to instruct the remote device by sending a SIP REFER message to the remote device, wherein the SIP REFER message references dialog information for the second call and includes a REPLACE header referencing the second call, to receive a SIP BYE message from the communications server with regard to the VoIP leg of the second call, and to receive a SIP NOTIFY message from the remote device confirming successful transfer of the VoIP leg of the second call to the new call.

16. The dual-mode device claimed in claim 10, wherein the communications server comprises a private branch exchange (PBX) having a PSTN interface and a SIP-capable IP interface.

17. The dual-mode device claimed in claim 10, wherein the dual-mode device comprises a wireless handheld device.

18. A computer program product comprising a non-transitory machine-readable medium having encoded thereon computer-executable instructions for handing over an active call between a dual-mode device and a remote device, wherein the dual-mode device includes a Voice-over-IP (VoIP) interface for wireless communications over an IP network and a cellular interface for wireless communications over a public land mobile network (PLMN), wherein the IP network includes a communications server, and wherein the active call is a VoIP call using the VoIP interface of the dual-mode device, the computer-executable instructions comprising:
- instructions for managing the handing over by placing the active call on hold;
- instructions for establishing a second call from the VoIP interface to the cellular interface of the dual-mode device via the communications server and the PLMN, wherein the second call includes a VoIP leg from the VoIP interface of the dual-mode device to the communications server;
- instructions for the dual-mode device instructing the remote device to initiate a new call to the communications server referencing the second call and causing the communications server to replace the VoIP leg of the second call with the new call, thereby joining the remote party to the second call connected to the cellular interface of the dual-mode device; and
- instructions for terminating the active call.

* * * * *